United States Patent
Ikeda (10) Patent No.: US 6,877,590 B2
(45) Date of Patent: Apr. 12, 2005

(54) DUAL MODE DRUM BRAKE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/385,016

(22) Filed: Mar. 10, 2003

(65) Prior Publication Data

US 2003/0168297 A1 Sep. 11, 2003

(30) Foreign Application Priority Data

Mar. 11, 2002 (JP) ......................................... 2002-065976

(51) Int. Cl.[7] .......................................... F16D 51/00
(52) U.S. Cl. .................................................. 188/79.54
(58) Field of Search .......................... 188/79.54, 79.62, 188/79.63, 325, 327, 341, 328, 79.51, 79.56

(56) References Cited

U.S. PATENT DOCUMENTS

| 5,538,112 | A | | 7/1996 | Last | |
|---|---|---|---|---|---|
| 6,003,645 | A | | 12/1999 | Asai et al. | |
| 6,065,571 | A | * | 5/2000 | Ikeda | 188/79.61 |
| 6,082,505 | A | * | 7/2000 | Asai et al. | 188/79.54 |
| 6,125,976 | A | * | 10/2000 | Asai et al. | 188/328 |
| 6,223,869 | B1 | * | 5/2001 | Asai et al. | 188/325 |
| 6,234,280 | B1 | * | 5/2001 | Asai et al. | 188/79.54 |

FOREIGN PATENT DOCUMENTS

| EP | 1160475 A2 | 12/2001 |
|---|---|---|
| EP | 1160475 A3 | 5/2003 |
| JP | 08 303492 | 11/1996 |

* cited by examiner

Primary Examiner—Robert A. Siconolfi
Assistant Examiner—Melanie Torres
(74) Attorney, Agent, or Firm—Tracy M Helms; Apex Juris, pllc (57) ABSTRACT

This dual mode drum brake provides less stroke loss during the brake operation; a stable parking brake effectiveness; and a comfortable feeling for the operator during the brake operation. A wheel cylinder actuator (15) is positioned between ends (11d) and (12d) of first and second brake shoes (11), (12); an anchor block (16) is positioned between the other ends (11e) and (12e); a shoe clearance adjustment device (18) is extended adjacent to the wheel cylinder actuator (15); a parking brake actuator (23) is extended adjacent to the anchor block (16); a bent portion (22c), formed on one side (22b) of a pivot lever (22) pivotally supported on the first brake shoe (11), is inserted between the first brake shoe (11) and the shoe clearance adjustment device (18) while the other side (22d) of the pivot lever (22) functionally engages with the parking brake actuator (23).

6 Claims, 6 Drawing Sheets

DUAL MODE DRUM BRAKE

BACKGROUND OF INVENTION

1. Field of the Invention

This invention relates to a dual mode drum brake and, more specifically, to a dual mode drum brake which functions as a leading-trailing (LT) type brake device during the service brake operation and which functions as a duo servo (DS) type brake device during the parking brake operation.

2. Description of the Related Art

Conventional dual mode drum brakes are, for example, disclosed in Australian patent number AU-B1-53 491/79, U.S. Pat. No. 5,275,260, and U.S. Pat. No. 6,003,645. Because the basic structure of these conventional dual mode drum brakes is adequately disclosed in the aforementioned publications and because they have identical structures and operation, the typical compositions are explained hereunder with reference to FIG. 6 only.

Figure 6:
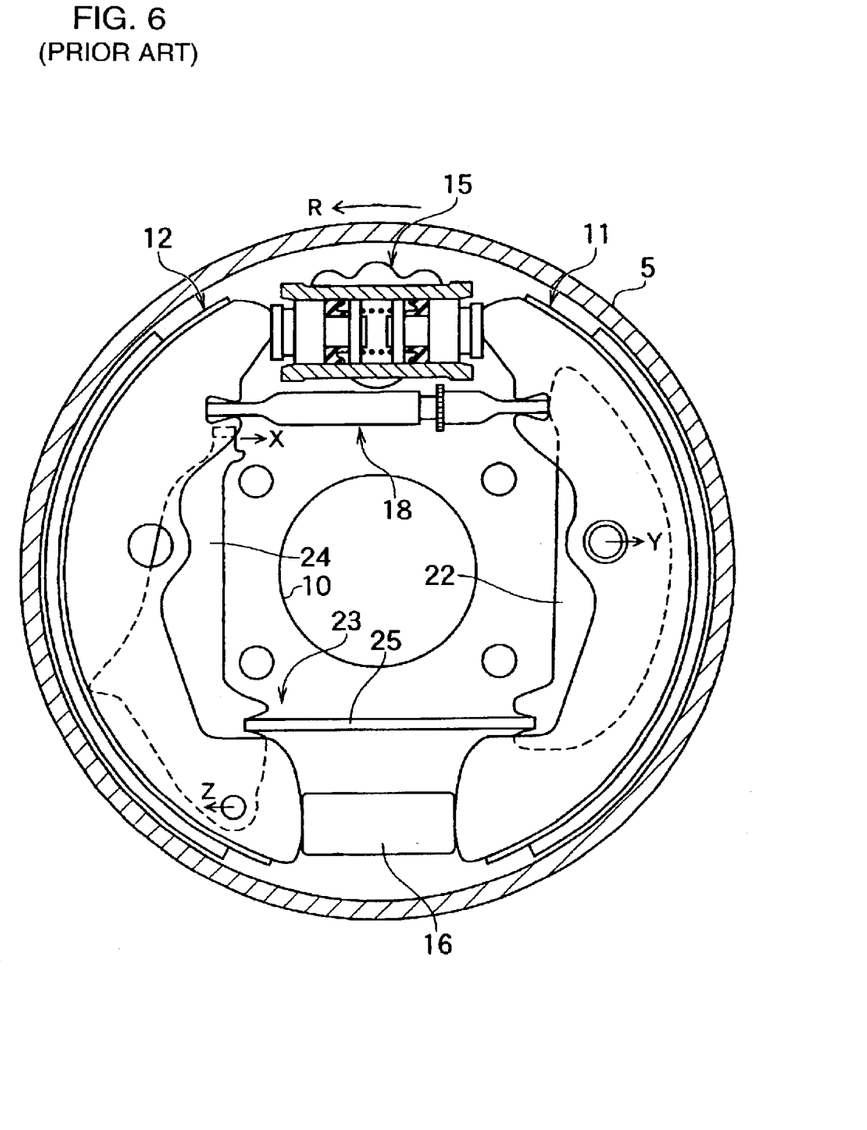
FIG. 6 is a mimetic view of the conventional dual mode drum brake equivalent to the one in FIG. 1.

A drum brake comprises a back plate 10 as a stationary member; a pair of brake shoes which includes a first brake shoe 11 and a second brake shoe 12 that are facing each other and are mounted on the back plate 10; a service brake actuator (i.e., a wheel cylinder actuator 15 in this figure) positioned between upper adjacent ends (or one adjacent ends) of two brake shoes 11 and 12; an anchor block 16 positioned between lower adjacent ends (or the other adjacent ends) of two brake shoes 11 and 12; a shoe clearance adjustment device 18 positioned adjacent to the wheel cylinder actuator 15 and extended between the two brake shoes 11 and 12; a parking brake actuator 23 positioned adjacent to the anchor block 16; and a pivot lever 22 pivotally supported on the first brake shoe 11 and positioned between both ends of the first brake shoe 11, an upper (or one) side and a lower (or the other) side of which is functionally engaging with the shoe clearance adjustment device 18 and the parking brake actuator 23, respectively. Shoe return springs (not shown in the figure) urging the first and the second brake shoes 11 and 12 toward each other, are extended between two adjacent upper sides of the brake shoes 11, 12 and between two adjacent lower sides of the brake shoes 11, 12 respectively.

Brake operation of the above-described structure will be explained next, and service brake operation will be explained first.

If the wheel cylinder actuator 15 is pressurized, both brake shoes 11 and 12 move and spread apart from each other around a point of abutment with the anchor block 16, thereby causing frictional engagement between brake shoes 11, 12 and a brake drum 5.

Parking brake operation will be explained next.

If a brake lever 24, a component of the parking brake actuator 23, is pulled in the direction of an arrow X, an operational force generated thereat is transmitted to a strut 25, also a component of the parking brake actuator 23, a pivot lever 22, and a shoe clearance adjustment device 18, thereby moving the second brake shoe 12 to cause a frictional engagement with the brake drum 5.

Then, the pivot lever 22 rotates counterclockwise around a point of abutment with the shoe clearance adjustment device 18, and the first brake shoe 11 is thrust in the direction of an arrow Y via a pivot section of the pivot lever 22 causing a frictional engagement with the brake drum 5.

Also, a reaction force of the brake lever 24 in a direction of an arrow Z acts on lower end of the second brake shoe 12.

If a rotational force in the direction of an arrow R acts on the brake drum 5 in the situation where a vehicle is on a slope, a frictional force of the first brake shoe (primary brake shoe) 11 is transmitted to the second brake shoe (secondary brake shoe) 12 via the shoe clearance adjustment device 18, which generates a braking force as a duo servo brake.

If a rotational force in an opposite direction of the arrow R acts on the brake drum 5, a frictional force of the second brake shoe (primary brake shoe) 12 is transmitted to the first brake shoe (secondary brake shoe) 11 via the shoe clearance adjustment device 18, which generates a braking force as a duo servo brake similar to the above-described duo servo brake.

The previous dual mode drum brake with the above-described structure had the following points to be improved.

When a vehicle is stopped on a slope, the operator of the vehicle will apply the service brake using the service brake pedal. Thereafter, the parking brake lever, usually a side brake lever, is pulled and locked to maintain the vehicle's stopped position and a pressing force on the brake pedal is decreased or the brake pedal is released.

The position of the contact point between an upper side of the pivot lever 22 and the shoe clearance adjustment device 18 varies because the position is determined by the dimensional preciseness of the pivot lever 22 and the first brake shoe 11.

For example, if the shoe clearance adjustment device 18 contacts the pivot lever 22 and a clearance exists between the shoe clearance adjustment device 18 and the brake shoe 11, the brake drum 5 rotates in either direction to carry the primary brake shoe 11 or 12, i.e., the brake shoe disposed at a primary side of a drum rotational direction, until the shoe clearance adjustment device 18 and the first brake shoe 11 contact each other. Therefore, the piston of the wheel cylinder actuator 15 is forced back by an amount that corresponds to the range of movement of the primary brake shoe 11 or 12.

As a result, the brake pedal is forced back, thereby giving the operator an uncomfortable feeling and also increasing the pedal stroke distance when operating the service brake immediately after above-operation.

During the parking brake operation, the brake drum 5 rotates in the opposite direction of the arrow R. The brake lever 24 is moved together with the second brake shoe 12 as the primary brake shoe. In this situation, a brake cable pulling the brake lever 24 is loosened, and braking effectiveness is suddenly decreased. If the operator reduces the pressure on a brake pedal or releases the brake pedal then this could cause a potentially dangerous situation and the operator to may need to take additional, immediate braking action.

If the shoe clearance adjustment device 18 contacts the first brake shoe 11 and clearance exits between the shoe clearance adjustment device 18 and the pivot lever 22, a stroke loss of the parking brake lever increases by an amount that corresponds to the clearance, thereby giving the operator an uncomfortable feeling when operating the parking brake If the pivot lever 22 is made in one piece by press, a contact surface of the pivot lever 22 with the shoe clearance adjustment device 18 becomes a fractured rough surface which tends to cause permanent deformation thereof and may gradually vary the point of contact with the shoe clearance adjustment device 18.

If an automatic shoe clearance adjustment device that automatically adjusts the clearance between the linings and the brake drum 5 does not exists, then when the linings of the brake shoes 11 and 12 are worn out, the brake stroke gradually increases, thereby causing the operator an uncomfortable feeling when operating the brake.

This invention was made to improve the above-points and also was designed to provide a dual mode drum brake device that provides less stroke loss during brake operation. This thereby constantly gives a stable parking brake effectiveness and furthermore gives a comfortable feeling for the operator when operating the brake.

SUMMARY OF THE INVENTION

In order to achieve the above objective, this invention provides a dual mode drum brake device comprising a first brake shoe and a second brake shoe facing each other to be mounted on a back plate; a service brake actuator positioned between two adjacent ends at one side of the two brake shoes; an anchor positioned between two adjacent ends at the other side of two brake shoes; a shoe clearance adjustment device positioned adjacent to the service brake actuator and extended between the first and the second brake shoes; a parking brake actuator positioned adjacent to the anchor; and a pivot lever pivotally supported on the first brake shoe and positioned between both ends of the first brake shoe, one end of the pivot lever functionally engages with the shoe clearance adjustment device while the other end with the parking brake actuator, wherein a bent portion formed on the pivot lever at one side thereof is inserted between the first brake shoe and the shoe clearance adjustment device.

This invention also provides the dual mode drum brake wherein the bent portion of the pivot lever is formed in an arc-shape so that an external side surface of the arc-shaped bent portion contacts the shoe clearance adjustment device and an internal side surface thereof contacts a shoe web of the first brake shoe or wherein the bent portion of the pivot lever is formed in C-shape so that an external surface on a bottom of the C-shaped bent portion contacts the shoe clearance adjustment device and an internal surface on the bottom thereof contacts the shoe web of the first brake shoe while an inner pocket space of the C-shaped bent portion holds the shoe web of the brake shoe therein.

Still further, the shoe clearance adjustment device may be an automatic adjustment device that automatically adjusts after sensing an excessive amount of movement of both brake shoes.

According to the dual mode drum brake as described above, the bent portion formed on the upper or one side of the pivot lever is inserted between the first brake shoe and the shoe clearance adjustment device, which holds and maintains the upper side of the pivot lever at the fixed position, thereby causing the piston force back range during the parking brake operation and the stroke loss of the parking brake lever to remain small.

Further, a flattened plate surface on the pivot lever contacts the first brake shoe and the shoe clearance adjustment device, which minimizes the permanent deformation.

Additionally, providing an automatic shoe clearance adjustment device for adjusting the shoe clearance automatically causes the brake-operating strokes to become and remain stable for a long period of time.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE PREFERRED EMBODIMENTS

An example of a dual mode drum brake in this invention is explained below with reference to the accompanying drawings. Example 1 of this invention employing this dual mode drum brake for motor vehicles will be explained in detail with reference to FIGS. 1 to 3.

Figure 1:
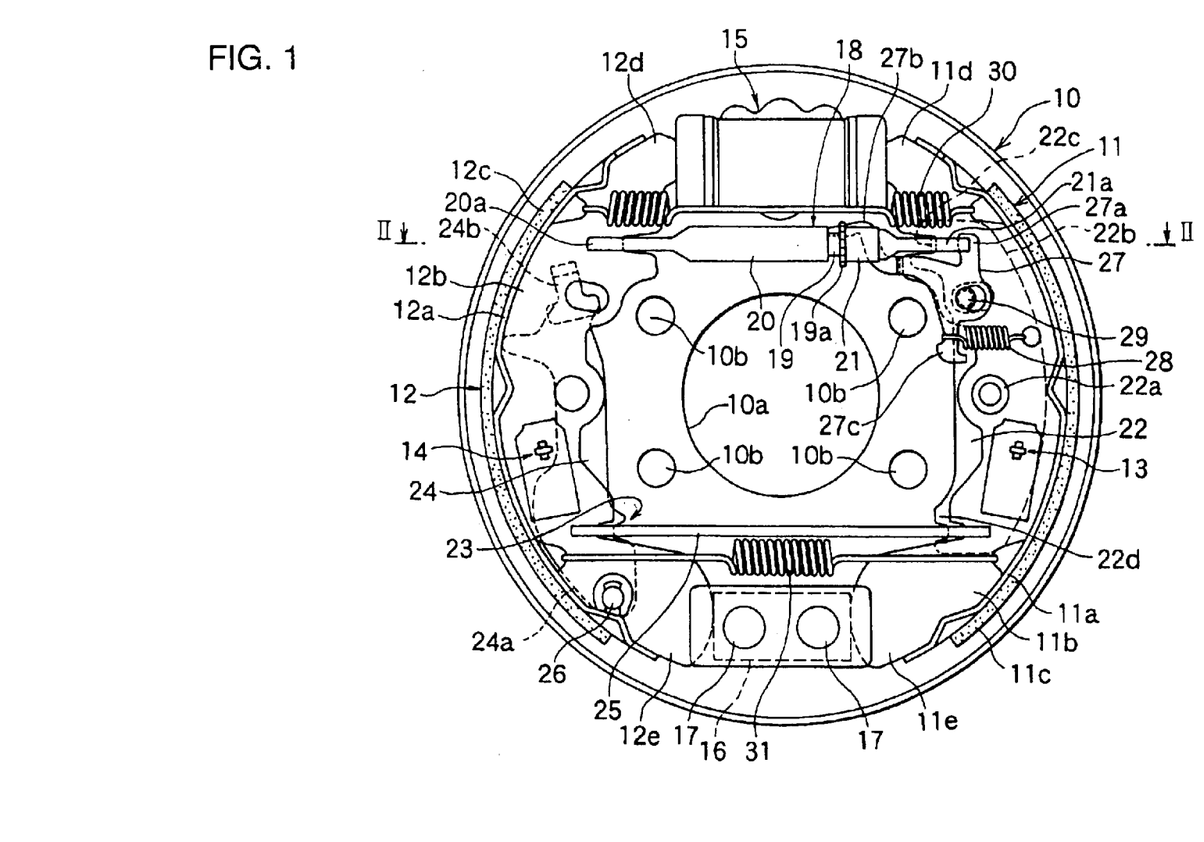
FIG. 1 is a plan view of a drum brake device as to Example 1 of this invention.

A vehicle axle is placed through a central hole 10a of a back plate 10 where back plate 10 is a stationary member and the back plate 10 is fixed on a stationary portion of a motor vehicle by four-bolts not shown in the figures. The four bolts are inserted through four bolt holes 10b formed around the central hole 10a.

A pair of facing first and second brake shoes 11 and 12, each makes a T-shape in cross-section as a shoe rim 11a joined together with a shoe web 11b while a shoe rim 12a joined together with a shoe web 12b, and linings 11c, 12c are affixed on peripheral surfaces of the shoe rims 11a, 12a respectively.

The first and second brake shoes 11 and 12 are movably mounted on the back plate 10 by conventional shoe-hold mechanism 13, 14, each composed of a plate spring and a pin.

In FIG. 1, a wheel cylinder actuator 15, functioning as a service brake actuator, is arranged between adjacent upper ends 11d and 12d of the brake shoes 11 and 12 and is mounted on the back plate 10 to be fixed thereon such as by bolts.

An anchor block 16 is arranged between lower adjacent ends 11e and 12e of the brake shoes 11 and 12, which is to be mounted on a protrusion of the back plate 10 and is thereon fixed by two rivets 17 and 17.

The wheel cylinder actuator 15 may be hydraulic, pneumatic, or electric as long as it provides a means to move and or spread apart the upper adjacent ends of the brake shoes 11, 12 from each other.

A telescopic shoe clearance adjustment device 18 composed of an adjustment bolt 19, an adjustment nut 20 and a socket 21, extends between the pair of brake shoes 11 and 12 adjacent to the wheel cylinder actuator 15.

Figure 2:
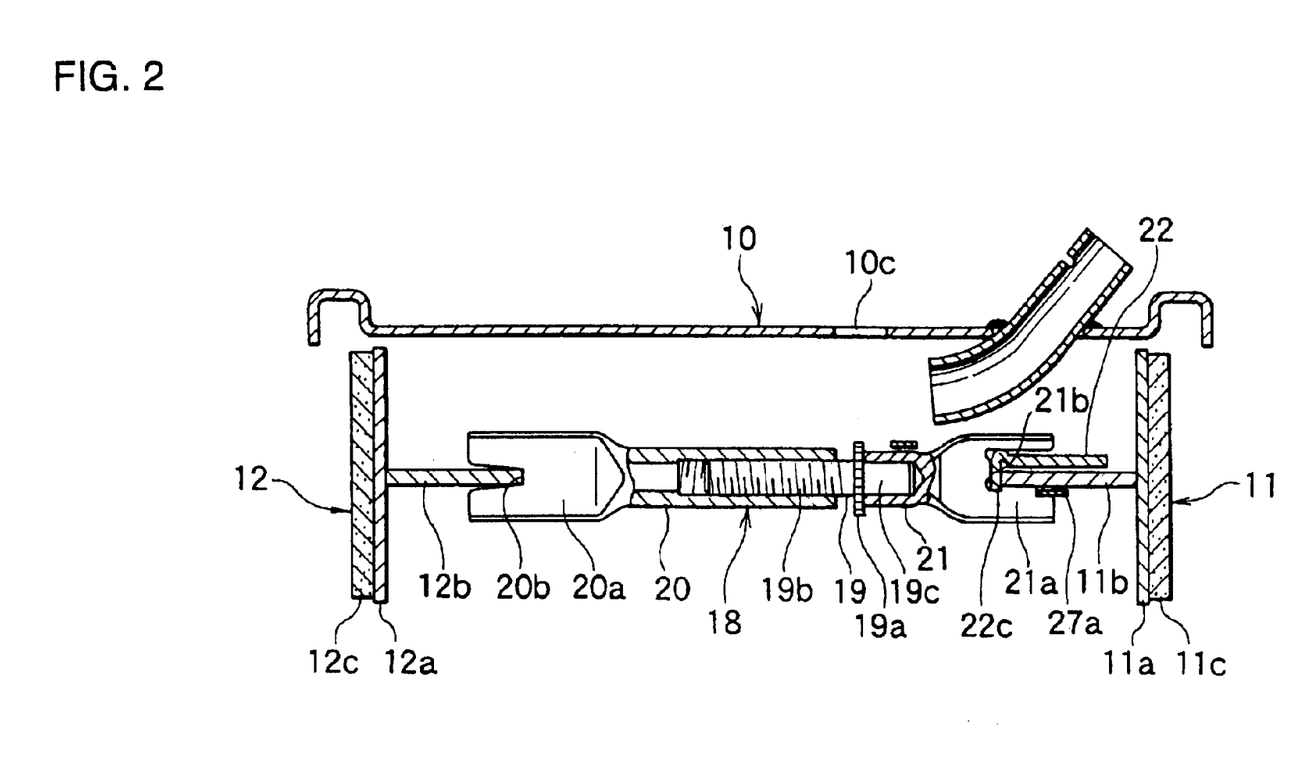
FIG. 2 is a cross-section view of FIG. 1 taken along the line II—II.

As shown in FIG. 2, the adjustment bolt 19 has serrated adjustment teeth 19a formed around a flange periphery between both ends thereof, and an external thread shaft 19b at a left side fits into the adjustment nut 20 while a stem shaft 19c at a right side relatively rotatably fits into the blind hole of the socket 21.

A left end portion of the adjustment nut 20 is pressed into a plate-shape, and the plate-portion 20a has a notched groove 20b at its left end which is intercrossed to fit with another notched groove formed on the shoe web 12b.

A right end portion of the socket 21 is pressed into a plate-shape, and the plate-portion 21a has a notched groove 21b at its right end which unrotatably intercrosses to fit with another notched groove formed on the pivot lever 22 wherein a bent portion 22c is formed on the same.

Tools such as a screwdriver may be inserted through an insertion hole 10c formed in the back plate 10 or a hole formed in a brake drum which is located outside of the figures and is therefore not shown. The serrated adjustment teeth 19a integrally formed on the adjustment bolt 19 may be manually rotated so that the adjustment bolt 19 may screw into or out from the adjustment nut 20 thereby allowing adjustment of the shoe clearance.

Instead of the above-described structure of the shoe clearance adjustment device 18, the shoe clearance adjustment device may comprise a bolt-like member, a nut-like member with adjustment teeth formed on the periphery, and a pipe-like member, wherein an externally threaded shaft of the bolt-like member slidably fits into a hole formed in the pipe-like member and one end of the nut-like member screws onto the externally threaded shaft of the bolt-like member and abuts against an end surface at an opening of the hole of the pipe-like member.

Figure 3:
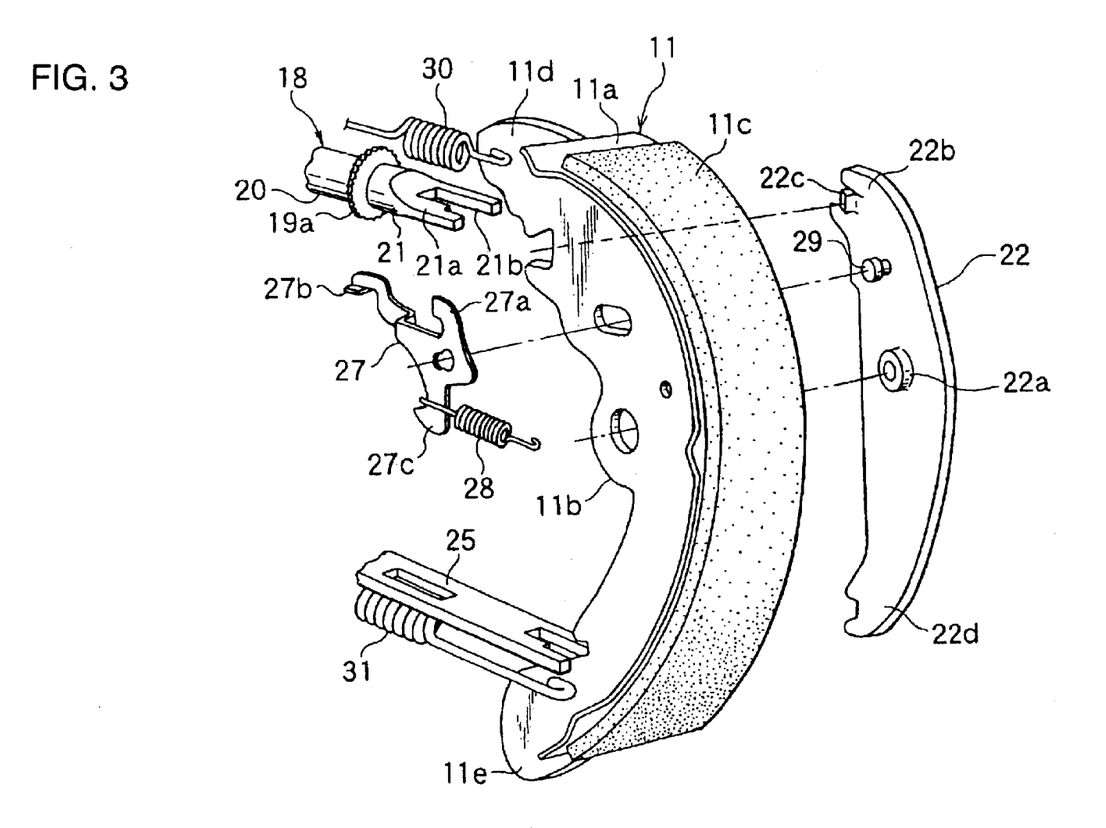
FIG. 3 is an exploded isometric view of the pivot lever and the first brake shoe regarding Example 1 of this invention.

The pivot lever 22 is a plate-like member which is superposed on a back plate 10 side of the shoe web 11b of the first brake shoe 11.

A protuberance 22a is formed by drawing or burring to project at a portion on the pivot lever 22 between both ends thereof, and the protuberance 22a fits in a hole formed in the shoe web 11b to pivot therein.

A bent portion 22c, being sandwiched between the shoe web 11b and the socket 21, Is formed by partial-shearing and bending so as to make a right angle with the plate-like member at the radially inward side of the brake at an upper or one side 22b of the pivot lever 22 as shown in FIG. 1.

Accordingly, the socket 21 is designed such that the notched groove 21b unrotatably intercrosses to fit with another notched groove formed at an end of the pivot lever 22.

A lower end or the other side 22d of the pivot lever 22 functionally engages with a strut 25 which is a component of the parking brake actuator 23.

The pivot lever 22 may be superimposed on the shoe web 11b at a side facing the bottom of the brake drum, and an additional separate pin member may be used instead of the protuberance 22a integrally formed on the pivot lever 22 to be supported on the shoe web 11b. The pivot lever 22 may be formed by casting and forging.

The parking brake actuator 23 is comprised of a brake lever 24 and the strut 25.

The plate-like brake lever 24 is superimposed on the shoe web 12b of the other brake shoe 12 at a back plate side, and a base end 24a thereof is pivotally supported at a lower end portion 12e of the shoe web 12 by a pin 26.

A free end 24b of the brake lever 24 is extending toward an upper side of the shoe web 12b, and a brake cable, not shown in the figures, is connected therewith.

The plate-like strut 25 extends adjacent to the anchor block 16 at radially inward side of the brake, and both ends thereof functionally engage with a middle portion of the brake lever 24 and the lower side 22d of the pivot lever 22.

An adjustment lever 27 and so on, sensing an excessive movement of both brake shoes 11 and 12 and automatically extending a shoe clearance adjustment device 18, are positioned at the first brake shoe 11 side.

The adjustment lever 27 is pivotally supported by a pin 29 standing between protuberance 22a and the upper side 22b of the pivot lever 22, and one arm 27a extending from the pivot section functionally abuts against a right end of the socket 21 while a claw section 27b thereof makes a ratchet engagement with the serrated adjustment teeth 19a formed on the adjustment bolt 19.

An adjustment spring 28, stretched between the other arm 27c also extending from the pivot section of the adjustment lever 27 and the shoe web 11b, urges the adjustment lever 27 counterclockwise in FIG. 1 and urges the claw section 27b toward the serrated adjustment teeth 19a constantly making a resilient contact.

In FIG. 1, the shoe clearance adjustment device 18 may be rotated for 180 degrees, the serrated adjustment teeth 19a are reversed to form and the adjustment lever 27 may be provided at the brake shoe 2 side.

A shoe return spring 30 is stretched between the upper sides of the brake shoes 11 and 12, urging the upper ends to approach each other, while a shoe return spring 31 is stretched between the lower sides of the brake shoes 11 and 12, urging the lower ends to approach each other. The upper side of the brake shoe 11 is supported by the socket 21 via the bent portion 22c of the pivot lever 22 while the upper side of the brake shoe 12 is supported by the adjustment nut 20, and adjacent lower ends 11e, 12e of both brake shoes 11 and 12 abut against the anchor block 16, thereby restricting the returning position of the pair of brake shoes 11 and 12.

Forces from the pair of shoe return springs 30, 31 are arranged such that a moment affecting the brake shoe 11, mainly on a fulcrum with the protuberance 22a of the pivot lever 22, is designed to be larger at the wheel cylinder actuator 15 side than that at the anchor block 16 side.

In the following section brake operation in the above-described configuration will be explained and service brake operation thereof will be omitted because it is identical or similar to the conventional devices.

In the parking brake operation, when the brake cable, described but not shown in FIG. 1, is pulled, the brake lever 24 in FIG. 1 rotates clockwise with the pin 26 as the fulcrum so as to push the strut 25, and a force generated therein rotates the pivot lever 22 counterclockwise with the protuberance 22a as the fulcrum, also moving the bent portion 22c of the pivot lever 22 to push the shoe clearance adjustment device 18, thereby moving the second brake shoe 12 to spread open so as to cause a frictional engagement between the lining 12c and the brake drum (brake drum is not shown in the figures).

Then, the pivot lever 22 rotates counterclockwise around a point of contact the shoe clearance adjustment device 18, and the protuberance 22a of the pivot lever 22 pushes the first brake shoe 11 to cause a frictional engagement between the lining 11c and the brake drum not shown in the figures.

At that time, the first brake shoe 11 moves to spread open around the point of abutment with the anchor block 16 because of differences in the moment affected by the two shoe return springs 30, 31.

Even if the brake drum not shown in the figures rotates in either direction, the brake shoe 11 or 12 at the primary side also rotates until contacting between the first brake shoe 11 and the bent portion 22c of the pivot lever 22, thereby generating duo servo type braking effectiveness.

Shoe clearance adjustment operation will be explained next.

In the service brake operation, if both brake shoes 11 and 12 move to spread apart from each other rotating around a point of adjustment with the anchor block 16 against the spring force of the shoe return springs 30, 31, the adjustment lever 27 of FIG. 1 rotates counterclockwise around the pin 29 due to the urging force of the adjustment spring 28; therefore the one arm 27a of the adjustment lever 27 moves the shoe clearance adjustment device 18 to follow the second brake shoe 12, while the pin 29 raised on the pivot lever 22 moves outward together with the first brake shoe 11.

At this time, the claw section 27b of the adjustment lever 27 rotates and moves downward to the degree corresponding with rotation of the one arm 27a and movement of the pin 29.

If the movement of the claw section 27b increases too much due to the wearing of the linings 11c, 12c and exceeds a tooth pitch of the serrated adjustment teeth 19a, the adjustment teeth 19a is rotated to screw the adjustment bolt 19 out from the adjustment nut 20 to extend the shoe clearance adjustment device 18, thereby automatically adjusting the shoe clearance.

According to the above-described Example 1 of this invention, the bent portion 22c formed at the upper end of the pivot lever 22, is inserted between the shoe web 11b of the first brake shoe 11 and the socket 21 as a component of the shoe clearance adjustment device 18 so that the bent portion 22c is held in a fixed position. Accordingly, the piston force back range during the parking brake operation may remain shorter, and a stroke loss of the parking brake lever may remain small, which improves the feeling of brake operation.

The shoe web 11b and the socket 21 contact the smooth surface of the bent portion 22c of the pivot lever 22, thereby minimizing the permanent deformation.

Furthermore, the shoe clearance adjustment device automatically adjusts the shoe clearance which provides a long period of stable brake operating strokes.

Examples 2 and 3 of this invention will be explained below. For explanation purposes, the same reference numbers as in the previous section describing the conventional device will be assigned to identical parts or sites having the same functions as described in Example 1, wherein the explanation will be made only as to the differences. Other explanations will be omitted here.

Figure 4:
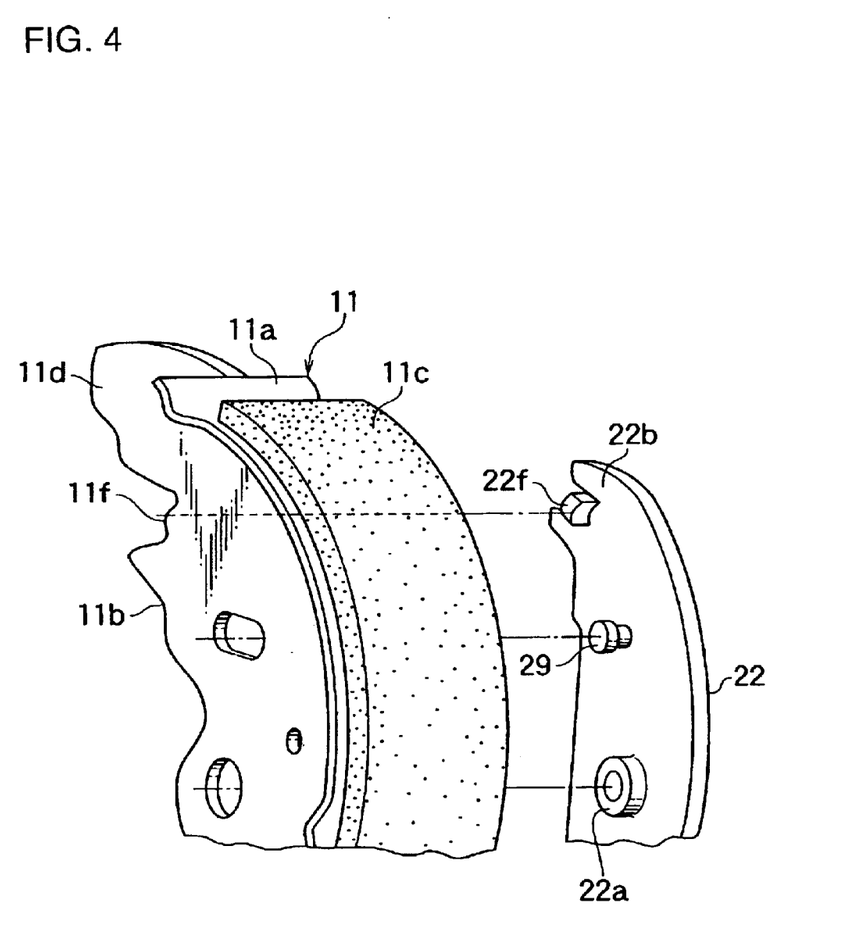
FIG. 4 is an exploded isometric view of a subject portion of the pivot lever and the first brake shoe regarding Example 2 of this invention.

Example 2 will be explained with reference to FIG. 4.

In this example, a bent portion 22f formed by partial-shearing and bending so as to make a right angle with the plate-like member to at the radially inward side of the brake on an upper or one side 22b of the pivot lever 22 has an arc-shaped surface so that an inner concave surface thereof faces a bottom surface 11f of a notched groove of the shoe web 11b. The bottom surface is formed in a convex arc-shape with curvature similar to the inner concave surface of the arc-shaped bent portion 22f.

Accordingly, the contacting lateral edge portions of the arc-shaped bent portion 22f to the lateral end of the socket 21 shown in FIG. 3 during the parking brake operation is avoided, which minimizes the permanent deformation due to consistent use.

Also, the inner surface of the arc-shaped bent portion 22f and the bottom surface 11f of the brake shoe 11 make relatively smooth movement at contacting surfaces thereof.

Figure 5:
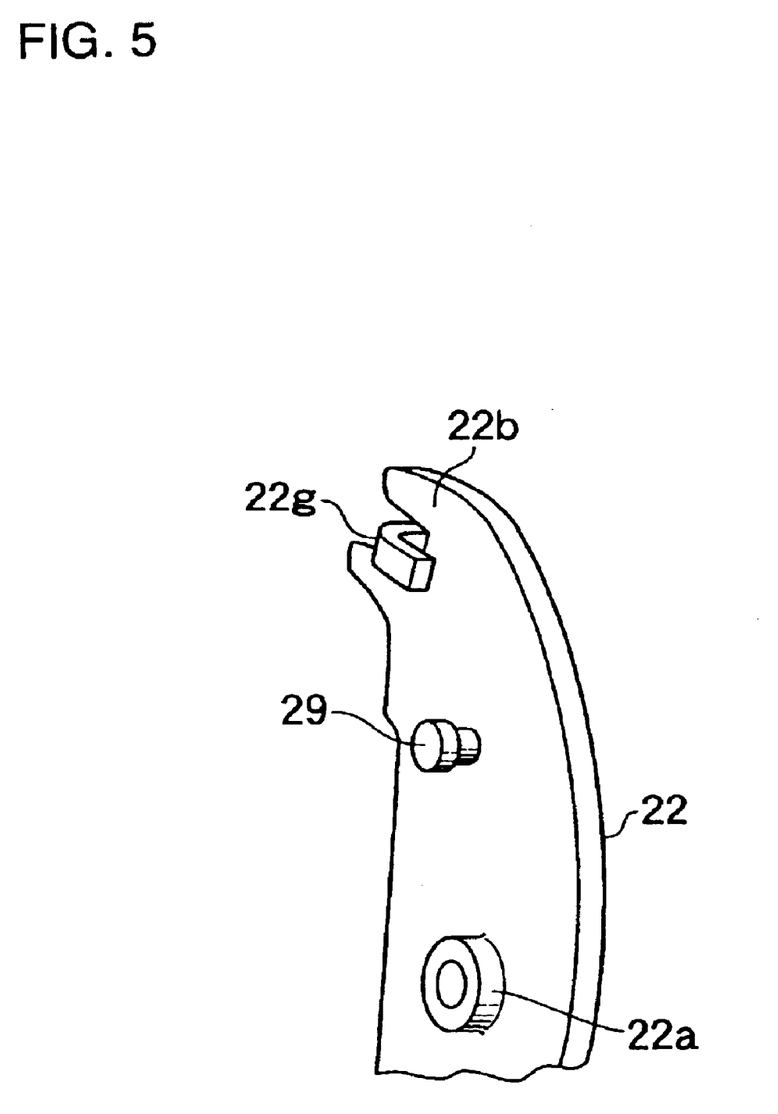
FIG. 5 is an isometric view of a subject portion of the pivot lever regarding Example 3 of this invention.

Example 3 of this invention will be explained with reference to FIG. 5.

This example uses a bent portion 22g which is formed by partial-shearing and bending. A strip is formed by partial-shearing on an upper or one side 22b of the pivot lever 22 at the radially inward side of the brake. Thereafter, the strip is bent so as to form a C-shaped bent portion 22g.

If one side of the shoe web contacts and fits in a pocket of the C-shaped bent portion 22g, a twisting or biasing force on the upper side 22b of the pivot lever 22 during the parking brake operation is restricted so as to increase the strength.

Structures of this invention are not limited to the above-descriptions, and alternatively for example, instead of so-called forward-pull type having the brake lever 24 parallel to the back plate 10 just as described in the example 1, so-called cross-pull type, in which a brake lever may be positioned orthogonal relative to a back plate 10 and the free end thereof extends to freely penetrate the back plate 10, may be used. For an automatic shoe clearance adjustment device, instead of the shoe clearance adjustment device 18 with an telescopic screw engagement mechanism, a different type of adjustment device shown in the FIGS. 9–10 of prior art U.S. Pat. No. 6,003,645, in which two facing sets of teeth formed on two facing members engage each other to extend the length of the two members due to the relative movement therebetween may be used.

Because of the above-described structure, this invention has the following advantages.

The bent portion formed at the upper or one side of the pivot lever is inserted between the shoe web of the first brake shoe and the shoe clearance adjustment device, so that the bent portion is held in a fixed position. Accordingly, the piston force back range during the parking brake operation may remain shorter, and a stroke loss of the parking brake lever may remain small, which improves the feeling of brake operation.

Minimizing the loosening of the brake cable and also minimizing the degrading of braking effectiveness, this invention provides a safe environment.

Furthermore, minimizing a brake pedal stroke when operating the service brake immediately after releasing the parking brake improves the feeling of the brake operation.

The bent portion of the pivot lever is inserted between the first brake shoe end the shoe clearance adjustment device, and the socket as one of the components of the shoe clearance adjustment device contacts the smooth surface of the bent portion, thereby minimizing the permanent deformation to improve the durability and at least minimize the parking brake lever stroke loss even if causing the least permanent deformation.

In the case that the bent portion of the pivot lever is formed in an arc-shape, the lateral edge portions of the arc-shaped bent portion do not contact at the lateral end of the socket. Also in the case where the bottom surface of the shoe web contacts the inner concave surface of the arc-shaped bent portion it is designed in a convex arc-shape with curvature similar to the inner concave surface of the arc-shaped bent portion. The inner surface of the arc-shaped bent portion and the bottom surface of the shoe web make smooth relative movement at contact surfaces thereof, thereby improving the durability.

Further, in the case that the bent portion of the pivot lever is formed in a C-shape, one side of the shoe web may contact and fit in a pocket of the C-shaped bent portion, thereby restricting any twisting or biasing force on the pivot lever during the parking brake operation so as to increase the strength.

Further, the automatic shoe clearance adjustment device for adjusting a shoe clearance automatically, provides a long, stable period of brake stroke operation.

It is readily apparent that the above-described invention is advantageous for use in wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

I claim:

1. A dual mode drum brake comprising:
   a first brake shoe and a second brake shoe facing each other to be mounted on a back plate;
   a service brake actuator positioned between two adjacent ends at one side of the two brake shoes;
   an anchor positioned between two adjacent ends at the other side of two brake shoes;
   a shoe clearance adjustment device, for adjusting a shoe clearance, positioned adjacent to the service brake actuator and extended between the first and the second brake shoes;
   a strut, a component of a parking brake actuator, positioned adjacent to the anchor, and
   a pivot lever pivotally supported on the first brake shoe and positioned between both ends of the first brake shoe, one end of the pivot lever functionally engages with the shoe clearance adjustment device while the other end with the parking brake actuator, wherein
   a bent portion formed on the pivot lever at said one end thereof is sandwiched between and contacts with the first brake shoe and said shoe clearance adjustment device.

2. The dual mode drum brake as claimed in claim 1, wherein
   the bent portion of the pivot lever is formed in arc-shape so that an external side surface of the arc-shaped bent portion contacts the shoe clearance adjustment device and an internal side surface thereof contacts a shoe web of the first brake shoe.

3. The dual mode drum brake as claimed in claim 1, wherein
   the bent portion of the pivot lever is formed in C-shape so that an external surface on a bottom of the C-shaped bent portion contacts the shoe clearance adjustment device and an internal surface on the bottom thereof contacts the shoe web of the first brake shoe while an inner pocket space of the C-shaped bent portion holds the shoe web of the brake shoe therein.

4. The dual mode drum brake as claimed in claim 1, wherein
   the shoe clearance adjustment device has a means to sense ranges of excessive movement of both brake shoes so as to automatically adjust a clearance between the brake shoes and a brake drum.

5. The dual mode drum brake as claimed in claim 2, wherein
   the shoe clearance adjustment device has a means to sense ranges of excessive movement of both brake shoes so as to automatically adjust a clearance between the brake shoes and a brake drum.

6. The dual mode drum brake as claimed in claim 3, wherein
   the shoe clearance adjustment device has a means to sense ranges of excessive movement of both brake shoes so as to automatically adjust a clearance between the brake shoes and a brake drum.

* * * * *